United States Patent
Boehme

(10) Patent No.: US 10,272,739 B2
(45) Date of Patent: Apr. 30, 2019

(54) METHOD FOR DISABLING A FOOTWELL AREA VENTILATION OF INDIVIDUAL SEATS OF A VEHICLE, AND DEVICE FOR CARRYING OUT THE METHOD

(71) Applicant: FORD GLOBAL TECHNOLOGIES, LLC, Dearborn, MI (US)

(72) Inventor: Dietmar Boehme, Duisburg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/234,567

(22) Filed: Aug. 11, 2016

(65) Prior Publication Data

US 2017/0050491 A1    Feb. 23, 2017

(30) Foreign Application Priority Data

Aug. 20, 2015  (DE) .......................... 10 2015 215 866

(51) Int. Cl.
    B60H 1/00          (2006.01)
(52) U.S. Cl.
    CPC ..... B60H 1/00842 (2013.01); B60H 1/00742 (2013.01); B60H 1/00964 (2013.01)
(58) Field of Classification Search
    None
    See application file for complete search history.

(56) References Cited

U.S. PATENT DOCUMENTS

| 2012/0234932 A1* | 9/2012 | Okamoto | F24H 3/002 237/2 R |
| 2014/0329450 A1* | 11/2014 | Hoke | B60H 1/00742 454/75 |
| 2015/0231947 A1* | 8/2015 | Shmueli-Friedland | B60H 1/00742 165/202 |

FOREIGN PATENT DOCUMENTS

DE    102010043385 A1    5/2012

OTHER PUBLICATIONS

English Machine Translation of DE102010043385A1.

* cited by examiner

*Primary Examiner* — Tamara L Weber
(74) *Attorney, Agent, or Firm* — Vichit Chea; King & Schickli, PLLC

(57) ABSTRACT

A method is provided for disabling a footwell area ventilation of individual seats of a vehicle. A device for carrying out the method is also provided. That device includes a ventilation system for a motor vehicle having a number of seats and at least one shut-off device for a footwell area ventilation for at least one seat, which can be set such that the footwell area ventilation for the seat is released or shut off.

5 Claims, 2 Drawing Sheets

METHOD FOR DISABLING A FOOTWELL AREA VENTILATION OF INDIVIDUAL SEATS OF A VEHICLE, AND DEVICE FOR CARRYING OUT THE METHOD

TECHNICAL FIELD

This document relates to a method for disabling a footwell area ventilation of individual seats of a vehicle, and to a device for carrying out the method.

BACKGROUND

Methods and devices for ventilating a footwell area of a vehicle, in particular of a motor vehicle, are known. In order to provide vehicle occupants with comfortable ventilation that ensures the air exchange in the vehicle and optimizes the thermal comfort, usually in combination with a heating and/or cooling of the vehicle interior, the interior areas around the seats are in particular given primary consideration. This also includes the footwell area or the footwell areas of the seats. In order to control the ventilation, flaps are usually used in ventilation and air-conditioning systems of motor vehicles, which flaps enable a variable air distribution, for example in the areas of window ventilation, individual fanning, and the footwell area.

EP 1 526 015 A1 by way of example discloses a flap of this type, which can be used in an air-conditioning unit or the central air distribution unit of a ventilation system. The flap makes it possible to adjust the proportion of air that is fed to the footwell area of the vehicle, there being no distinction made here with regard to individual seats within the vehicle, the footwell area air having to be distributed, however, between individual seats downstream, after the flap. Merely a distribution between the front and rear footwell area can already be provided by the design of the flap and cooperation thereof with two corresponding air channels.

The vehicle occupants can typically preselect, via an operating device of the vehicle air-conditioning system, whether the air is to be distributed for window ventilation, for individual fanning, or into the footwell area, wherein it is very often also possible to select mixed settings. In order to heat a cold vehicle interior in winter operation, it is expedient here to select a setting of footwell area ventilation, in order to achieve on the one hand effective warming throughout the interior, wherein a natural convection on account of the lower density of hot air also causes this hot air to be transported into the upper regions of the interior, and in order to attain on the other hand a subjective feeling of warmth at the feet of the occupants. In order to cool a hot vehicle interior in summer operation, it is, by contrast, expedient to select the individual fanning setting in order to achieve an effective and turbulent cooling and mixing of the air in the vehicle interior (also assisted here by natural convection on account of the higher density of the cooled air) and in order to attain a subjective cooling effect in the region of the upper body and the head. Under conditions of climate transition, i.e. in moderately cool or moderately warm climate, it is expedient to select a mixed setting between individual fanning and footwell area ventilation. For this reason, an automatic air-conditioning controller usually also provides corresponding flap settings depending on the climate conditions.

In particular when setting the ventilation in summer operation, however, the extent to which a ventilation (in particular a proportionally small ventilation) of the footwell area in conjunction with the ventilation setting of individual fanning is advantageous is the topic of dispute. Among different population groups, in different regions of the world, but also among different individuals, there are quite different preferences in this respect. Many people perceive a cool flow of air in the footwell area, in particular when provided over a relatively long period of time, as an unpleasant draught. Here, lightweight leg coverings and/or open footwear can also particularly intensify such sensitivity. The usual local vicinity of the footwell area outlets relative to the feet and legs of the vehicle occupants (depending on which seat position a person occupies) can additionally cause an airflow of this type to be particularly noticeable, since it is conducted to parts of the body surface in a concentrated and directed manner. For other people, however, the subjectively perceived cooling effect is assisted in a rather pleasant manner when a little cool air is conducted into the footwell area, for example in an initial cooling phase following vehicle start-up with a heated vehicle interior.

In this context, a ventilation system is described, for example in WO 2014/036208 A1, in which a forced ventilation of the footwell area is provided by means of a bypass channel. This bypass channel makes it possible to provide a small amount of air for footwell area ventilation when this ventilation setting is actually switched off by the corresponding flap in cooling operation with the ventilation setting of individual fanning being selected. With the disclosed embodiment, an assignment of the bypass channel to the footwell area ventilation for the front region of the vehicle interior is evident. It is thus disadvantageous that there is no option to set a footwell area forced ventilation selectively and individually for any seat. It is also disadvantageous that the forced ventilation set by the bypass channel can no longer be influenced subsequently, depending on whether this may or may not be desired by a particular vehicle occupant.

A device by means of which a forced ventilation of the footwell area can be controlled depending on an external temperature is disclosed in KR20080010545. Both a degree of opening and a time of the footwell area ventilation are considered here in dependence of the external temperature. A certain differentiation is thus possible in respect of different conditions that can accompany the external temperature. A differentiation in respect of different people in the vehicle, however, consequently an individual setting of the forced ventilation of the footwell areas of all seats, is not disclosed here, either.

SUMMARY

It is an object to provide a method for disabling a footwell area ventilation for at least one seat of a vehicle, which makes it possible to effectively operate an economical ventilation system whilst avoiding the above-described disadvantage of a footwell area ventilation that cannot be individually set in cooling operation.

The new and improved method for disabling a footwell area ventilation for at least one seat of a vehicle includes the following steps:
- detecting an air distribution mode set by an operator or an automatic function of an air-conditioning controller
- determining whether the air distribution mode provides or causes a footwell area ventilation
- requesting a preference as to whether or not a footwell area ventilation is desired for at least one seat
- switching off the footwell area ventilation for the at least one seat with the aid of at least one shut-off device when the set air distribution mode provides or causes a footwell area ventilation and when a footwell area ventilation for the at least one seat is not desired.

Here, footwell area ventilation for a seat is understood to mean the production of an airflow that can be clearly felt by a vehicle occupant sitting on the seat with uncovered or lightly covered feet and/or legs. The airflow is produced here by means of at least one outlet, which is disposed in the immediate vicinity of the footwell area or in the footwell area of the seat. The footwell area extends here in a vertical direction from the floor of the vehicle interior to the upper edge of the seating surface of the seat. In the vehicle longitudinal direction, the footwell area of the seat extends over the entire length that can be reached by the feet of the seat occupant. In the vehicle transverse direction, the footwell area to be assigned to the seat is delimited by the side walls of the vehicle interior and/or at least one adjacent seat. Disabling the footwell area ventilation means that, with uncovered or lightly covered feet and/or legs, an airflow can no longer be felt in the footwell area of the at least one seat.

The step of detecting an air distribution mode set by an operator or an automatic function of an air-conditioning controller can be carried out in the case of the method by way of example in that a setting implemented at an operating device is evaluated. In the case of an electronic operating device, this setting is usually already present in digital form and can be directly utilized. In the case of a mechanical operating device, which is connected for example via tensioned wires to air flaps in a ventilation system, the setting can be provided for example by the introduction of contact switches, which are assigned to the operating device itself and/or thus connected thereto, in the form of binary switch information. In the case of automatic regulation of the ventilation system, for example in conjunction with automatic climate control, with the aid of a control device, the setting of the air distribution is also usually directly available in digital form, since it is required for the actuation of actuators assigned to the air flaps.

In the step of determining whether the air distribution mode provides or causes a footwell area ventilation, it is ascertained by evaluation of the set air distribution mode, i.e. by comparison with stored data, whether footwell area ventilation is provided with the setting of this mode. The comparison with stored data can be implemented here on a discrete basis, for example by look-up in a table, or by interpolation between two data points representing air distribution settings adjacent to that selected. As an example, the footwell area setting at the operating device of the ventilation system or the air-conditioning system can correspond to an air distribution mode in which the primary airflow or also the entire airflow is conveyed to the footwell area ventilation. However, in addition to the air distribution modes in which a ventilation of the footwell area is expressly desired by the operator because it is already suggested by the symbols accompanying the setting, there are also modes in which a proportion of the footwell area ventilation is not explicitly communicated by the symbols. Here, the forced ventilation of the footwell area with the individual fanning setting, as mentioned in the introduction, is one example, in which case the footwell area is ventilated although this is not explicitly set by the operator. In addition, there is also the case that a certain leakage airflow to the footwell area ventilation is caused by leaks in the air distribution system of the vehicle, for example on account of the incomplete sealing of air distribution flaps. By reducing the seal, a more economical design can sometimes be implemented, or the operating forces when adjusting the flaps can be reduced. Here as well, however, there is the factor that, on account of a leakage airflow, a footwell area ventilation is provided, this being known in the design of the ventilation system and therefore also being able to be taken into consideration when providing the data in a corresponding table or the like.

When setting the air distribution mode for the ventilation system, it is thus known in many cases to the operator that a footwell area ventilation is provided, but in other cases this is not known. Furthermore, is often also the case that other vehicle occupants have preferences with regard to a footwell area ventilation that are different from those of the operator controlling the settings at the operating device. Indeed, in the higher-end vehicle sector there is often the possibility to implement a temperature setting or also a setting of the air distribution separately for the driver and front passenger. More seldom, it is also possible to set a third—or in the luxury sector even a fourth—air-conditioning zone for further occupants. However, this results in a high design outlay. It is therefore usual in a majority of vehicles for there to be just one setting possibility or zone provided for the entire vehicle interior with regard to the air distribution. It is therefore important to record the preference of the occupants with regard to the footwell area ventilation. The method therefore includes the step of requesting a preference as to whether or not a footwell area ventilation is desired for at least one seat. In this step, it is determined individually whether or not the vehicle occupant in the at least one seat desires a footwell area ventilation.

When the set air distribution mode provides or causes a footwell area ventilation, and when the preference is known as to whether or not a footwell area ventilation is desired for at least one seat, the footwell area ventilation can be released or switched off accordingly. This happens in the step of switching off the footwell area ventilation for the at least one seat with the aid of at least one shut-off device when the set air distribution mode provides or causes a footwell area ventilation and when a footwell area ventilation is not desired for the at least one seat.

On account of the particular sensitivity of many people in respect of a ventilation of the footwell area, in particular in conjunction with lightweight leg coverings and/or open footwear, an effective personalization can be achieved with relatively low design outlay as a result of the selective release or switch-off of a footwell area ventilation.

It is advantageous when, in the method, the preference for the at least one seat is requested with the aid of at least one setting device, which can be operated by the vehicle occupant(s). The at least one setting device can be a knob or a button, or can also be part of a menu structure in a vehicle configuration system. Here, the at least one setting device can request the preference for a seat or also for a number of seats.

It is particularly advantageous when the request is made with the aid of at least one setting device which is part of an operating device of an air-conditioning system and/or ventilation system. As a result of this assignment of the setting device, an additional setting possibility is created for personalization of the air-conditioning system and/or ventilation system.

In another, particularly preferred embodiment of the method, the preference for the at least one seat is requested by calling up stored data assigned to the at least one seat and/or the occupant sitting on the at least one seat. This data can be stored in the vehicle, for example as part of a memory function, which can also include other settings, such as positioning of a seat and/or of a mirror, or in particular also settings concerning the air-conditioning system and/or ventilation system. The data can also be stored on a vehicle key or another personal electronic device belonging to an occupant. The data can also be present in a storage device located outside the vehicle, and can be called up as necessary via a remote data connection. It is also possible for the data to form part of a country coding of the vehicle. This means that, depending on the country in which the vehicle was delivered or in which the vehicle is situated, data is stored regarding whether or not a footwell area ventilation is desired for at least one seat.

In addition, it is advantageous when the footwell area ventilation for the at least one seat is switched off only when the temperature of the air conveyed into the footwell area lies below a first limit value. A particularly unpleasant feeling of a cold draught can thus be effectively eliminated, yet the functionality of the footwell area ventilation is nevertheless maintained, for example when heating a cold vehicle interior. Here, an expedient first limit value should lie below the usual skin surface temperature of the occupants, for example in the range from 15° to 30° C. Since the thermal comfort of the occupants, however, is also influenced inter alia by the air speed produced by the ventilation, this and further factors should be taken into consideration with the exact fixing of the first limit value.

Similarly, it is also advantageous when the footwell area ventilation for the at least one seat is switched off only when the temperature of the air conveyed into the footwell area lies above a second limit value. It is thus possible to avoid a ventilation with air that is unpleasantly warm or too hot, particularly in view of the local vicinity of the outlet of the footwell area ventilation to body parts of the vehicle occupants. An expedient second limit value could lie here in the range from 55° to 65° C.

It is advantageous in the method when the first limit value and/or the second limit value can be set with the aid of a setting device. It is thus possible to achieve an even further refined personalization of the ventilation or air conditioning.

It is particularly advantageous when the first limit value and/or the second limit value is/are set under consideration of a temperature outside the vehicle. A different temperature sensitivity of the vehicle occupants, which can accompany different external climatic conditions, can thus be taken into account. By way of example, the clothing of the occupants can be concluded with the aid of the external temperature.

The device for carrying out the method includes
a ventilation system for a motor vehicle having a plurality of seats
at least one shut-off device for a footwell area ventilation for at least one seat, which means can be set such that the footwell area ventilation for the seat is released or shut off.

The shut-off device can be, for example, a flap, which is assigned to the at least one seat, is mounted in a ventilation channel, and can be adjusted with the aid of an actuator. Instead of a flap, however, another vent or a device of any other embodiment that can perform the specified task can also be used.

In an advantageous embodiment, the device contains at least one setting device, which is used when carrying out the new and improved method.

BRIEF DESCRIPTION OF THE DRAWING FIGURES

DETAILED DESCRIPTION

Figure 1:
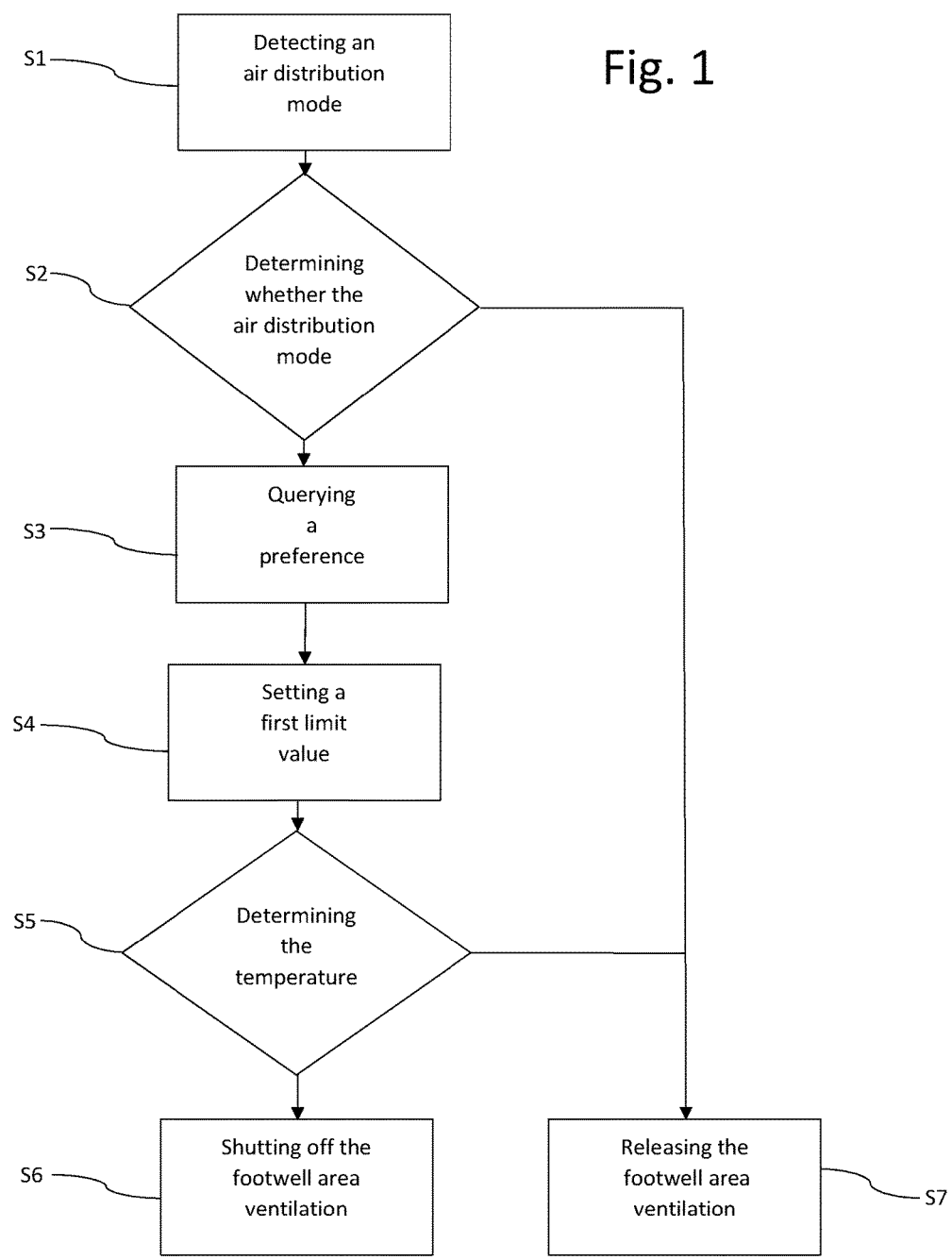
FIG. 1 shows a flowchart of a preferred embodiment of the new and improved method.

FIG. 1 shows, by way of example, a preferred embodiment of the new and improved method. Here, in the step S1 of detecting an air distribution mode set by an operator or an automatic function of an air-conditioning controller, it is checked which air distribution mode is set. This is typically a setting relating to a number of, or even all, seats of the vehicle. The setting may have been made for example by an operator, in particular an occupant of the vehicle, via a setting device. However, it is just as possible for an operator/vehicle occupant to have activated the automatic function of an air-conditioning controller and for the automatic function to have set an air distribution mode depending on the external climatic conditions and the interior target temperature.

In the step S2 of determining whether the air distribution mode provides or causes a footwell area ventilation, it is then determined, by comparison with stored data, whether a footwell area ventilation is provided with the setting of this mode. For this purpose, a table stored in a control device is analyzed, for example. The table contains stored data regarding the air distribution modes in which air is to be conveyed for footwell area ventilation. By way of example, an air distribution mode set by the automatic climate control with 25° C. external temperature and 22° interior target temperature in the adjusted state can include a 20% proportion of footwell area ventilation.

In the step S3 of querying a preference as to whether or not a footwell area ventilation is desired for at least one seat, the vehicle occupant sitting in the seat can then input, for example via a setting device, whether the footwell area ventilation is to be disabled. The occupant can for example select that no footwell area ventilation is desired.

In the step S4 of setting a first limit value of the temperature of the air conveyed into the footwell area, below which limit value the footwell area ventilation is shut off, a limit temperature is fixed. This limit temperature can be determined depending on an input of the occupant and/or an external temperature. The first limit value can be set for example to 15° C. For example, on account of increased sunshine, the automatic function of the air-conditioning controller can cause the temperature of the air conveyed by the ventilation system, and therefore also the air conducted into the footwell area, to be reduced to 12° C.

The step S5 of determining the temperature of the air conducted into the footwell area now means that the temperature either is ascertained using sensors or is already present, for example in the control device of the automatic climate control, and can be used for comparison. Lastly, in the step S6 of shutting off the footwell area ventilation for the at least one seat with the aid of at least one shut-off device, the footwell area ventilation is disabled, provided the criteria are met. Otherwise, if the criteria are not met, the shut-off device is/remains opened in the step S7 of releasing the footwell area ventilation for the at least one seat.

Figure 2:
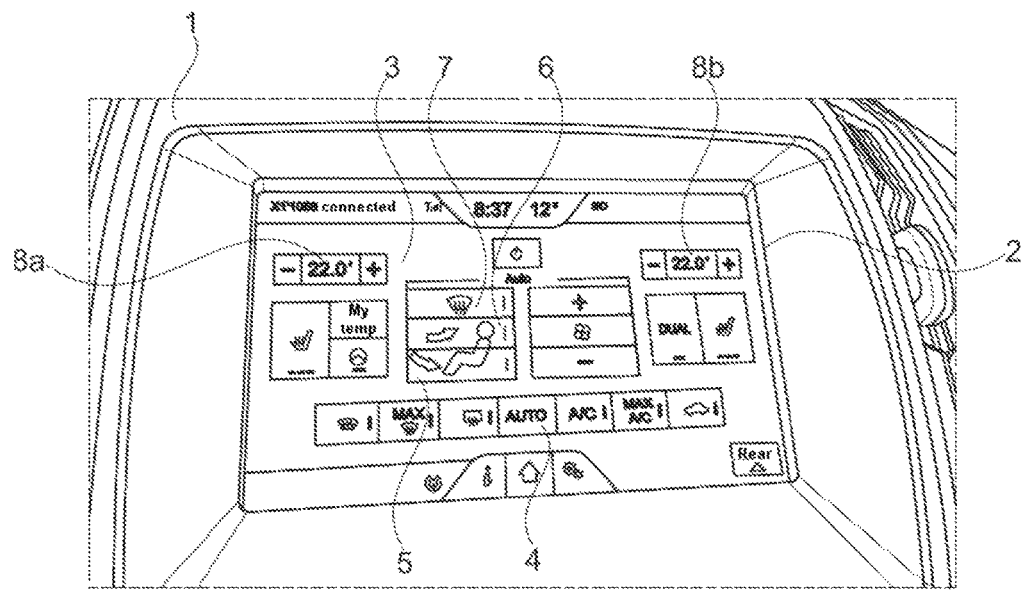
FIG. 2 and FIG. 3 show exemplary setting device that can be used when carrying out the method.
Figure 3:
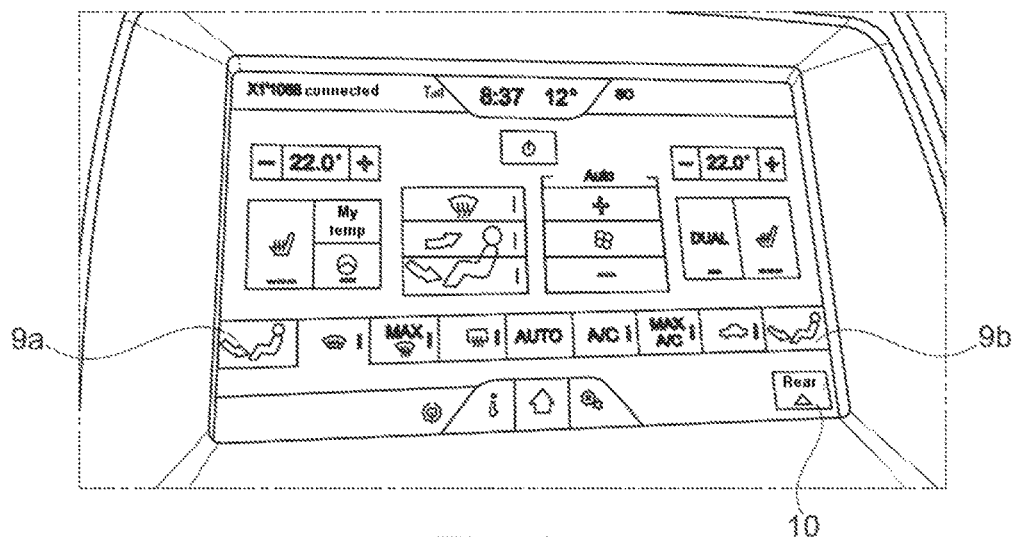

FIG. 2 shows a setting device of a device for carrying out a preferred embodiment of the method described in this document. The vehicle configuration system 1 contains a touchscreen 2, on which the air-conditioning settings 3 can be displayed and changed. Via the button automatic function 4, the automatic air-conditioning controller can be activated. Alternatively, the automatic function can be limited or deactivated by manual interventions. The air distribution mode can be fixedly set via the footwell area air distribution button 5, the individual fanning air distribution button 6, and window ventilation air distribution button 7. Here, the buttons can be selected separately from one another or also together, such that, by combinations, a total of 7 different air distribution modes can be set. A temperature setting can be implemented via the driver-side (front) temperature setting button 8a and front passenger-side (front) temperature setting button 8b. In the example illustrated in FIG. 2, the automatic function 4 of the air-conditioning controller is activated. In the air distribution mode, which has been set by the automatic function in dependence of the present external climatic conditions and the interior target temperature, there is no footwell area ventilation in this example. If an air distribution mode that provides or causes a footwell area ventilation is now set by an occupant/operator by manual intervention, the display of the air-conditioning settings 3 on the touchscreen 2 to will be adapted. This adaptation is presented in FIG. 3. With activation of the footwell area air distribution button 5 by an occupant/operator, an air distribution mode is set that primarily ventilates the footwell areas. The setting affects all seats in the vehicle equally. Since the air distribution mode thus set provides a footwell area ventilation, the two buttons now show no driver-side footwell area ventilation (front) 9a and no front passenger-side footwell area ventilation (front) 9b. By means of these buttons, the footwell area ventilation for the seats can be shut off selectively. If the footwell area ventilation for one seat is shut off via one of the buttons, the display of the corresponding button thus changes and is shown shaded. Since the setting via the buttons for no driver-side footwell area ventilation (front) 9a and for no front passenger-side footwell area ventilation (front) 9b, similarly to the temperature setting, concerns only the front seats of the vehicle, a similar screen display of the air-conditioning settings can be activated via the rear passenger compartment setting button 10, and this then relates to the rear seats of the vehicle.

The invention claimed is:

1. A device, comprising:
    at least one setting device;
    an air-conditioner controller;
    a memory;
    one or more temperature sensors;
    a ventilation system for a motor vehicle having a number of seats; and
    at least one shut-off device for the footwell area ventilation for at least one seat, which is set such that the footwell area ventilation for the seat is released or shut off wherein said air-conditioner controller is configured to switch off the footwell area ventilation for the at least one seat with aid of at least one shut-off device when a set air distribution mode provides or causes a footwell area ventilation and when said footwell area ventilation for the at least one seat is not desired, wherein the footwell area ventilation for the at least one seat is shut off when a temperature of the air conducted into the footwell area lies below a first limit value and when the temperature of the air conducted into the footwell area lies above a second limit value, and wherein the first limit value and/or the second limit value is set with aid of the at least one setting device.

2. A method for disabling a footwell area ventilation for at least one seat in a vehicle, comprising:
    detecting an air distribution mode set by an operator or an automatic function of an air-conditioning controller;
    determining whether the air distribution mode provides or causes a footwell area ventilation;
    requesting a preference as to whether or not a footwell area ventilation is desired for at least one seat, wherein the preference for the at least one seat is requested by calling up stored data assigned to the at least one seat and/or an occupant sitting on the at least one seat; and
    switching off the footwell area ventilation for the at least one seat with aid of at least one shut-off device when the set air distribution mode provides or causes a footwell area ventilation and when said footwell area ventilation for the at least one seat is not desired, wherein the footwell area ventilation for the at least one seat is shut off when a temperature of the air conducted into the footwell area lies below a first limit value and when the temperature of the air conducted into the footwell area lies above a second limit value, and wherein the first limit value and/or the second limit value is set with aid of a setting device.

3. The method as claimed in claim 2, wherein the preference for the at least one seat is further requested with aid of said setting device.

4. The method as claimed in claim 2 wherein the request is made with aid of the setting device, which is part of an operating device of an air-conditioning system and/or ventilation system.

5. The method as claimed in claim 2, wherein the first limit value and/or the second limit value is/are set under consideration of a temperature outside the vehicle.

* * * * *